(12) United States Patent
Sheth et al.

(10) Patent No.: US 8,332,481 B2
(45) Date of Patent: Dec. 11, 2012

(54) SYSTEMS AND METHODS FOR TRANSMITTING SUBJECT LINE MESSAGES

(75) Inventors: Niral Sheth, Austin, TX (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 310 days.

(21) Appl. No.: 12/262,286

(22) Filed: Oct. 31, 2008

(65) Prior Publication Data

US 2010/0115034 A1    May 6, 2010

(51) Int. Cl.
G06F 15/16 (2006.01)
H04M 11/00 (2006.01)
(52) U.S. Cl. .................. 709/217; 709/206; 379/93.01
(58) Field of Classification Search .......... 709/204–207; 379/93.01
See application file for complete search history.

(56) References Cited

U.S. PATENT DOCUMENTS

| | | | |
|---|---|---|---|
| 5,875,236 A * | 2/1999 | Jankowitz et al. ....... | 379/114.24 |
| 6,041,103 A | 3/2000 | La Porta et al. | |
| 6,400,808 B1 | 6/2002 | Burg | |
| 6,438,216 B1 | 8/2002 | Aktas | |
| 6,766,007 B1 | 7/2004 | Dermler et al. | |
| 7,062,021 B2 | 6/2006 | Starbuck et al. | |
| 7,319,857 B2 | 1/2008 | Baldwin et al. | |
| 7,502,364 B2 * | 3/2009 | Milstein et al. ............... | 370/356 |
| 2003/0215070 A1 * | 11/2003 | Akhteruzzaman et al. ........................... | 379/88.19 |
| 2004/0221037 A1 | 11/2004 | Costa-Requena et al. | |
| 2005/0021351 A1 | 1/2005 | Koskinen et al. | |
| 2007/0127686 A1 | 6/2007 | Song et al. | |
| 2007/0208798 A1 * | 9/2007 | Kagawa et al. ............... | 709/201 |
| 2007/0263607 A1 * | 11/2007 | Milstein et al. ............... | 370/356 |
| 2007/0263808 A1 | 11/2007 | Van Wyk et al. | |
| 2008/0062895 A1 * | 3/2008 | Chapman et al. ............. | 370/270 |

* cited by examiner

*Primary Examiner* — Peling Shaw
*Assistant Examiner* — Thomas Richardson
(74) *Attorney, Agent, or Firm* — Toler Law Group, PC

(57) ABSTRACT

A system and method of sending subject line messages is provided. A particular method includes receiving a call setup signaling message. The call setup signaling message includes a message identifier. The method further includes determining a subject line message associated with the message identifier of the call setup signaling message. The message identifier is replaced with the subject line message. The method further includes transmitting the call setup signaling message to a called party.

24 Claims, 8 Drawing Sheets

SYSTEMS AND METHODS FOR TRANSMITTING SUBJECT LINE MESSAGES

FIELD OF THE DISCLOSURE

The present disclosure is generally related to systems and methods for transmitting subject line messages.

BACKGROUND

Currently, when a person receives a call, the called party may receive caller identification information (caller ID information, such as caller name or telephone number) of the call originator. For people who are busy or receive many calls, this may not be enough information to decide whether to answer the call or not.

DETAILED DESCRIPTION OF THE DRAWINGS

A system and method of sending subject line messages is disclosed. In a particular embodiment, a method includes receiving a call setup signaling message. The call setup signaling message includes a message identifier. The method further includes determining a subject line message associated with the message identifier of the call setup signaling message. The message identifier of the call setup signaling message is replaced with the subject line message. The method further includes transmitting the call setup signaling message to a called party.

In another particular embodiment, a communication system includes a processor and a memory coupled to the processor. The communication system further includes a call setup interface adapted to receive a call setup signaling message from a caller device. The call setup signaling message includes a message identifier. The communication system further includes logic to determine a subject line message associated with the message identifier. The message identifier of the call setup signaling message is replaced with the subject line message. The communication system further includes logic to transmit the call setup signaling message to a called party device via the call setup interface.

In another particular embodiment, a computer-readable medium includes operational instructions that, when executed by a processor, cause the processor to receive a call setup signaling message from a caller device. The call setup signaling message includes a Session Initiation Protocol (SIP) INVITE message. The received SIP INVITE message includes a SIP subject header that includes a message identifier. The computer-readable medium further includes operational instructions that, when executed by the processor, cause the processor to determine a subject line message associated with the message identifier based on a predetermined list. The predetermined list includes a plurality of subject line messages, where each subject line message is associated with a particular message identifier. The message identifier of the call setup signaling message is replaced with the subject line message. The computer-readable medium further includes operational instructions that, when executed by the processor, cause the processor to transmit the call setup signaling message to a called party device. Transmitting the call setup signaling message to the called party device includes transmitting the SIP INVITE message to the called party device. The transmitted SIP INVITE message includes a modified SIP subject header that includes the subject line message.

Figure 1:
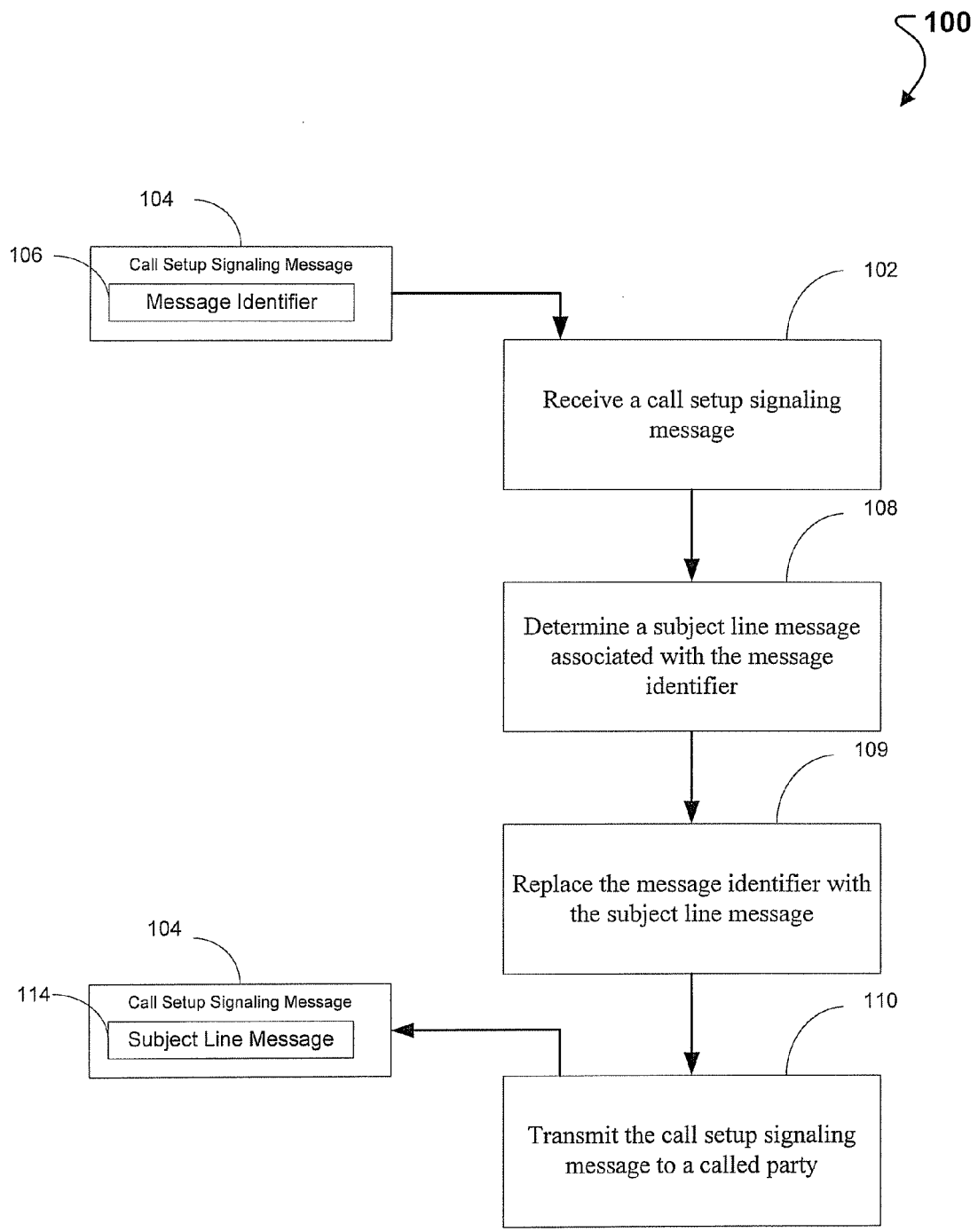
FIG. 1 is a flow chart of a first particular embodiment of a method of transmitting a subject line message to a called party.

Referring to FIG. 1, a flow chart of a first particular embodiment of a method of transmitting a subject line message to a called party is illustrated, at 100. The method includes, at 102, receiving a call setup signaling message 104. The call setup signaling message 104 includes a message identifier 106. In a particular embodiment, the message identifier 106 corresponds to a pre-stored subject matter identifier that may be input or selected by a user of a customer premises equipment (CPE) device. In a particular embodiment, the CPE device may be a mobile telephone, a cellular telephone, a conventional telephone, a personal computer, a Voice over Internet Protocol (VoIP) telephone, or another end-user telephony device. The method further includes determining a subject line message that is associated with the message identifier 106, as shown at 108. In a particular embodiment, the message identifier 106 is a numerical or alpha-numerical identifier that may be linked to a subject line message 114. In one embodiment, the message identifier 106 is linked to the subject line message 114 at a subject line message repository. The subject line message 114 may be retrieved from the subject line message repository based on the message identifier 106. The message identifier 106 is replaced with the subject line message 114, at 109. The method further includes, at 110, transmitting the call setup signaling message 104 including the subject line message 114 to a called party. In a particular embodiment, the called party is a destination party that receives a telephone call or other data communication from an originating party (e.g., a caller). In a particular embodiment, the subject line message 114 includes information provided by the caller to the called party related to a reason for a telephone call.

Figure 2:
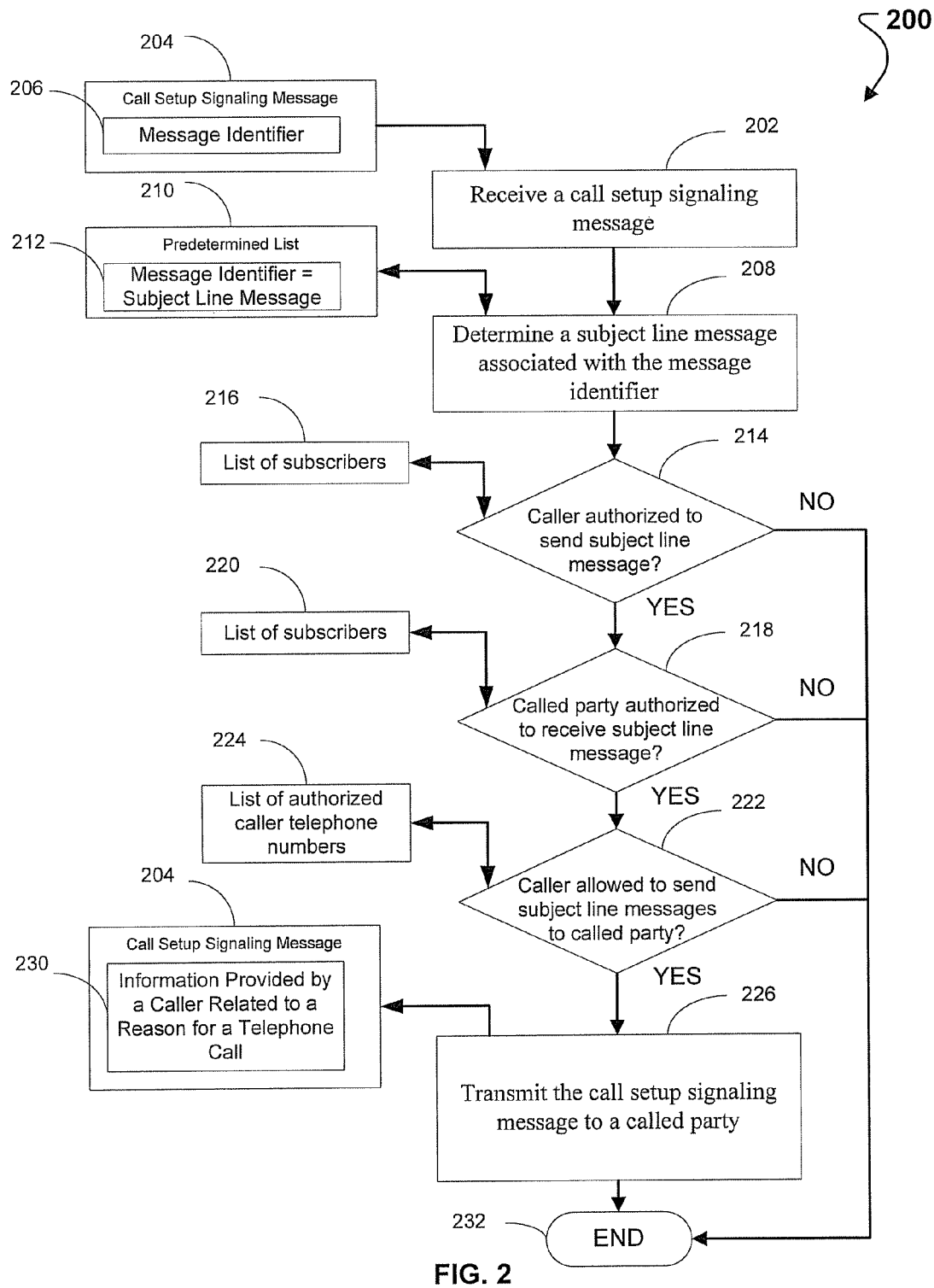
FIG. 2 is a flow chart of a second particular embodiment of a method of transmitting a subject line message to a called party.

Referring to FIG. 2, a flow chart of a second particular embodiment of a method of transmitting a subject line message to a called party is illustrated, at 200. The method includes, at 202, receiving a call setup signaling message 204. The call setup signaling message 204 includes a message identifier 206. The method further includes determining a subject line message associated with the message identifier 206, at 208. The subject line message may be mapped or otherwise linked to the message identifier 206, as shown at 212. In a particular embodiment, a predetermined list 210 includes mapping information that maps the message identifier 206 to the subject line message.

In the particular embodiment illustrated in FIG. 2, the method further includes determining whether the caller is authorized to send the subject line message, at 214. For example, a list of subscribers 216 (e.g., callers that have subscribed to a subject line message service) may be consulted to determine whether the caller is authorized to send the subject line message. As a further example, the method may include determining whether the caller is delinquent on an account (e.g., whether the caller has paid one or more recent bills). When the caller is not authorized to send the subject line message, the method ends at 232 since subject line message communications are not authorized for the caller.

When the caller is authorized to send the subject line message, as determined at 214, the method continues at 218. At 218, a determination is made whether the called party is authorized to receive the subject line message. For example, a list of subscribers 220 (e.g., called parties that have subscribed to the subject line message service) may be consulted to determine whether the called party is authorized to receive the subject line message. As a further example, the method may include determining whether the called party is delinquent on an account (e.g., whether the called party has paid one or more recent bills). When the called party is not authorized to receive the subject line message, the method ends at 232 since subject line message communications are not authorized for the called party.

In the particular embodiment illustrated in FIG. 2, the method further includes determining whether the caller is allowed to send subject line messages to the called party, at 222. Determining whether the caller is allowed to send subject line messages to the called party may include determining whether a telephone number of the caller is included in a list of authorized caller telephone numbers 224. In a particular embodiment, the list of authorized caller telephone numbers 224 is a configurable list of callers that the called party can receive subject line messages from. For example, the called party may want only team members or a supervisor to be able to send subject line messages (e.g., a caller white list), while other callers are not allowed to send subject line messages (e.g., a caller black list). Thus, the caller white list may be stored to allow transmission of subject line messages from authorized callers, and the caller black list may also be stored to block transmission of subject line messages from unauthorized callers. In this manner, the receiving party (e.g., the called party) can provide for further security and filters with respect to subject line message communications. When the caller is not allowed to send subject line messages to the called party, the method ends at 232.

When the caller is allowed to send subject line messages to the called party, as determined at 222, the method continues at 226. At 226, the method includes transmitting the call setup signaling message 204 to the called party. The call setup signaling message 204 includes the subject line message.

In the particular embodiment shown in FIG. 2, the call setup signaling message 204 includes a subject line message that includes information 230 provided by a caller related to a reason for a telephone call. In a particular embodiment, the information 230 may be provided by a caller using various input capabilities of an end-user communication device. For example, the end-user communication device may include a "smart phone", a cellular phone, a set-top box, or another electronic device accessible to an IP communication network. Thus, a caller may use a variety of different devices accessible to the IP communication network to provide the information 230 related to the reason for a particular telephone call. The reason provided by the caller may be a pre-determined message or may be a user defined custom message. Once the information 230 is provided by the caller via the end-user communication device, the information 230 may be communicated via the IP communication network to the called party, thereby facilitating enhanced information for the called party to improve end-to-end communications.

Figure 3:
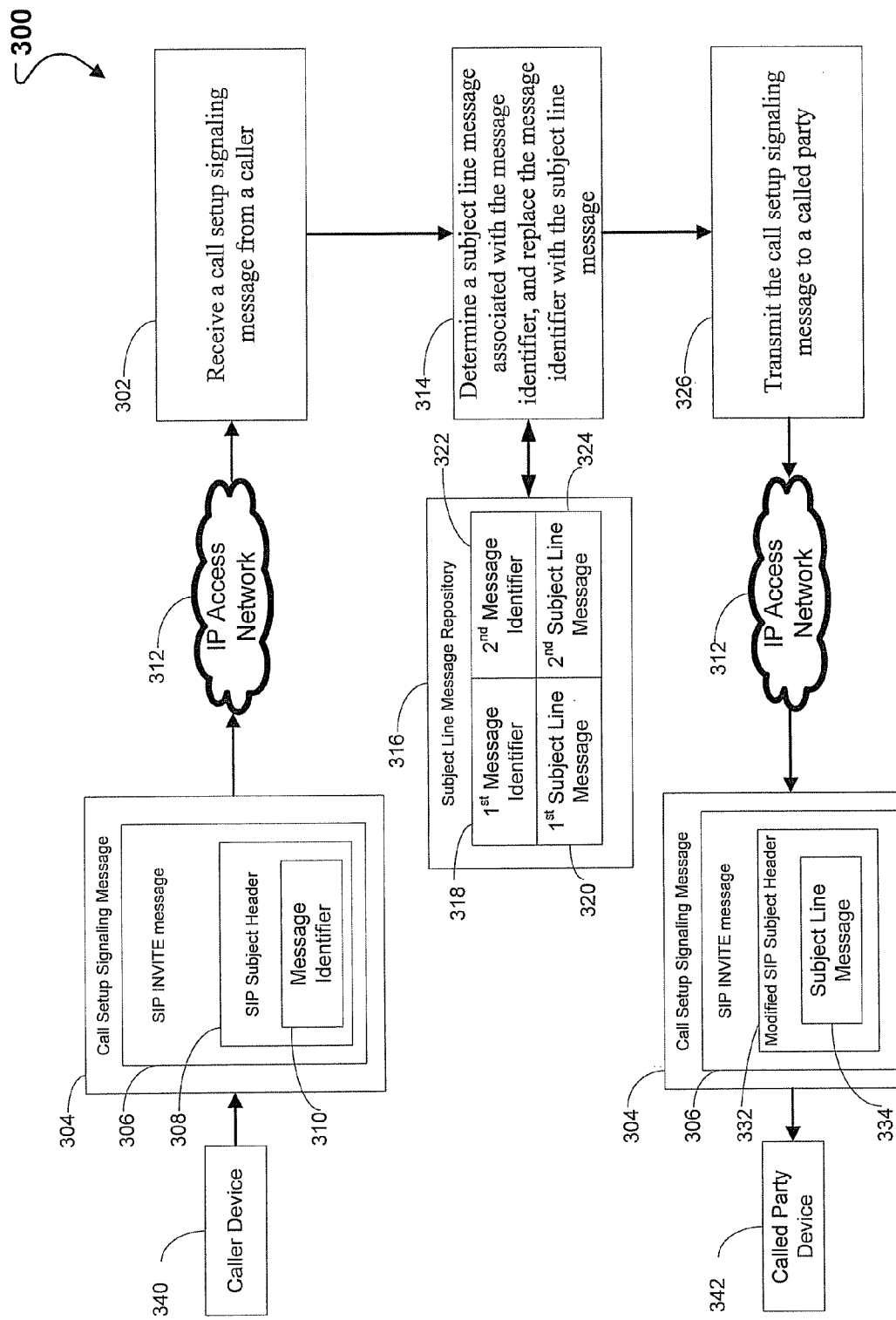
FIG. 3 is a flow chart of a third particular embodiment of a method of transmitting a subject line message to a called party.

Referring to FIG. 3, a flow chart of a third particular embodiment of a method of transmitting a subject line message to a called party is illustrated, at 300. At 302, a call setup signaling message 304 is received from a caller device 340 via an IP Access network 312. In a particular embodiment, the call setup signaling message 304 includes a Session Initiation Protocol (SIP) INVITE message 306. The received SIP INVITE message 306 includes a SIP subject header 308 which includes a message identifier 310.

In a particular embodiment, the SIP INVITE message 306 is received at an originating IP Multimedia Subsystem (IMS) session call session control functions (S-CSCF) server. The originating IMS S-CSCF server sends the telephone call to a particular subject line messaging application server. The particular subject line messaging application server is selected based on originating initial filter criteria (iFC) retrieved for the caller device from a home subscriber server (HSS) at registration. In a particular embodiment, the originating IMS S-CSCF sends the telephone call to an application server assigned to the caller. The application server assigned to the caller performs originating feature treatment, such as determining if the caller subscribes to the subject line message service. If the caller does not subscribe to the subject line message service, the subject line messaging application server removes the SIP subject header 308. If the caller subscribes to the subject line message service, the SIP subject header 308 is not removed. In a particular embodiment, the originating IMS S-CSCF server queries the HSS to determine a terminating IMS S-CSCF associated with the called party. The originating IMS S-CSCF server sends the telephone call to the terminating IMS S-CSCF associated with the called party. Based on terminating iFC, the terminating IMS S-CSCF determines if the called party subscribes to the subject line message service. If the called party does not subscribe to the subject line message service, the telephone call is routed to another application server, based on the terminating iFC. If the called party subscribes to the subject line message service, the telephone call is routed to the subject line messaging application server.

In a particular embodiment, the subject line messaging application server determines if the called party has enabled the subject line message service. If the called party has not enabled the subject line message service or has disabled the subject message service, the subject line messaging application server removes the SIP subject header 308. In another particular embodiment, the subject line messaging application server determines whether the caller is allowed to send subject line messages to the called party. For example, determining whether the caller is allowed to send subject line messages to the called party may include determining whether a telephone number of the caller is included in a list of authorized caller telephone numbers. If the caller is not on the list of authorized caller telephone numbers, the subject line messaging application server removes the first SIP subject header 308. If the caller is on the list of authorized caller telephone numbers, the method proceeds to 314.

At 314, a subject line message 334 associated with the message identifier 310 is determined, and the message identifier 310 is replaced with the subject line message 334. In a particular embodiment, the subject line message 334 is determined by accessing information from a subject line message repository 316. The subject line message repository 316 may be stored within a database accessible to a network service provider via an IP communication network. In one embodiment, the method includes retrieving the subject line message 334 from the subject line message repository 316 based on the message identifier 310 of the received SIP INVITE message 306. The subject line message repository 316 may include a plurality of subject line messages, where each subject line message is associated with a particular message identifier. For example, in FIG. 3, a first message identifier 318 is associated with a first subject line message 320, and a second message identifier 322 is associated with a second subject line message 324. It should be understood that the subject line message repository 316 may include any number of message identifiers, and each message identifier may be associated with a particular subject line message stored in a retrievable format.

At 326, the call setup signaling message 304 is transmitted via the IP Access network 312 to a called party device 342. The call setup signaling message 304 includes the SIP INVITE message 306, including a modified SIP subject header 332. The modified SIP subject header 332 includes the subject line message 334 to be delivered to the called party device 342.

In a particular embodiment, the functions illustrated in boxes 302, 314, 316 and 326 are elements of a Session and Application Layer of a Third Generation Partnership Program (3GPP) IMS architecture. The 3GPP IMS architecture may include a plurality of different interconnected communication elements that may be used for data and call traffic communications. The 3GPP IMS architecture is an example of a next generation network (NGN). For example, the NGN may be based on an Alliance for Telecommunications Industry Solutions (ATIS) NGN framework, a European Telecommunications Standards Institute (ETSI) NGN framework, or a Telecoms & Internet converged Services & Protocols for Advanced Networks (TISPAN) NGN framework. Next generation networks use Session Initiation Protocol (SIP) for call setup signaling. An NGN architecture separates network accesses, session control, and application services to allow rapid deployment of new application services. An NGN architecture is capable of providing a large variety of real-time multimedia communication services consistently on various network accesses. Request for Comment (RFC) 3261 (SIP) supports a header subject to enable a subject text to be sent from the caller to the called party.

Thus, call setup signaling messages may be used within an IMS context to facilitate communication of message identifiers linked to specific subject line messages as shown. Use of NGN technologies can enhance network operator performance and reduce cost as well as provide increased functionality. In addition, the subject line message capabilities disclosed provide a new feature for an NGN operator to differentiate from more basic services such as caller ID information (e.g. caller name or telephone number). Having the capability for the called party to determine who is calling and the reason for the call may enable the called party to make better decisions when determining whether to answer an incoming call and may allow the called party to differentiate calls having a higher priority or urgent nature as compared to other calls which may be suitable for a later call back.

The disclosed subject line messaging systems and methods provide enhanced communication and additional information with respect to called parties receiving communications, such as telephone calls from originating calling parties. In a particular embodiment, the disclosed subject line messaging systems and methods may be implemented using a subject line messaging service that is enabled using an IMS network based platform and configured using an originating iFC and a terminating iFC based on subscriber service profiles stored within an HSS system. As another benefit, use of the SIP messages and signaling mechanisms of the disclosed subject matter provides for more ubiquitous implementations with respect to service providers having a need to balance user acceptance against service manageability and network performance.

Figure 4:
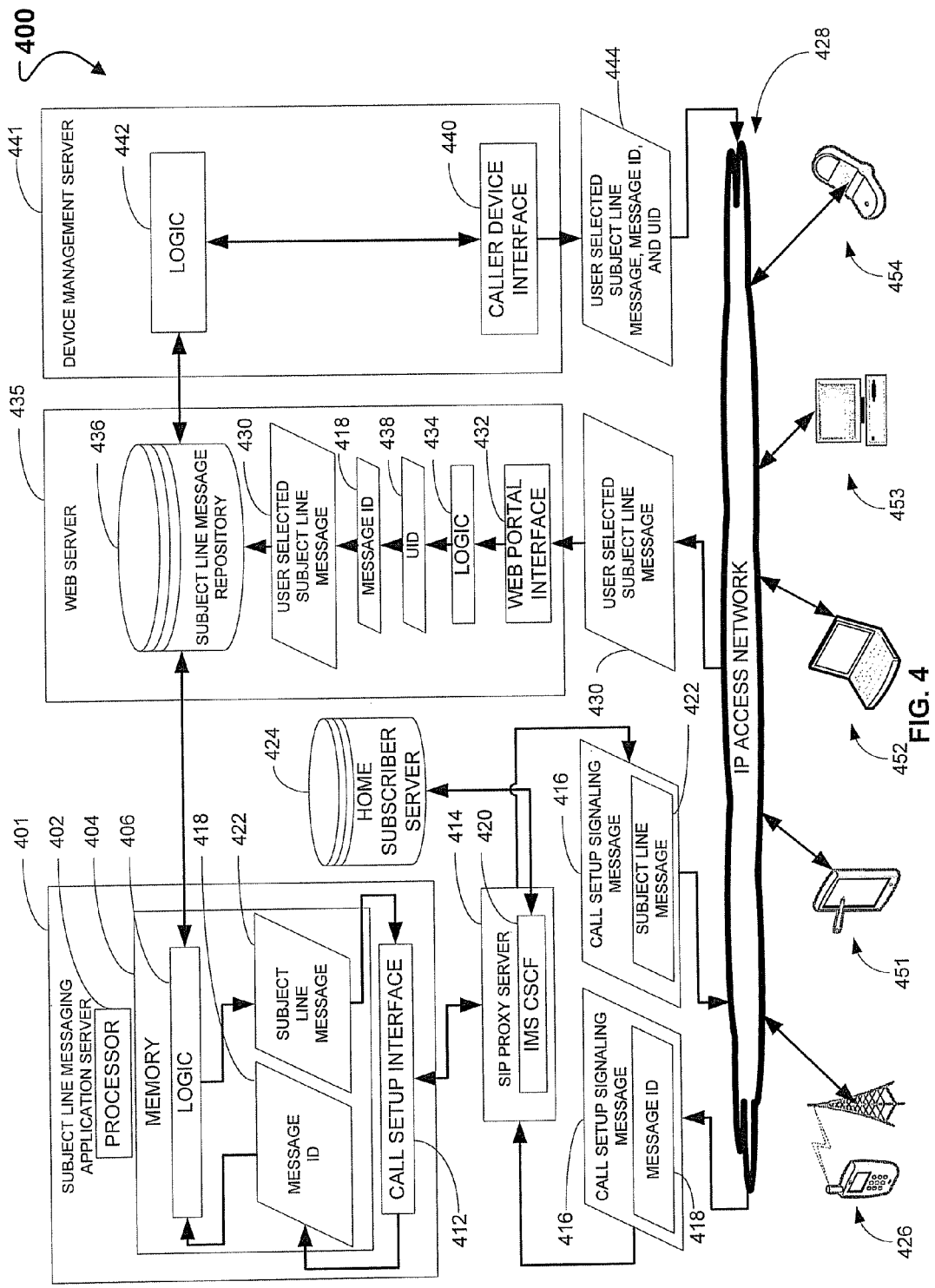
FIG. 4 is a block diagram of a particular embodiment of a communication system.

Referring to FIG. 4, a block diagram of a particular embodiment of a communication system is illustrated, at 400. The communication system 400 includes a subject line messaging application server 401, a web server 435, a device management server 441, a SIP proxy server 414, a home subscriber server (HSS) 424, and an IP Access Network 428. The subject line messaging application server 401 is coupled to the SIP proxy server 414, which is coupled to the HSS 424. In addition, the subject line messaging application server 401 is coupled to the web server 435, which is coupled to the device management server 441.

In the embodiment shown in FIG. 4, the IP Access Network 428 is in communication with a plurality of different end-user communication devices (e.g., caller devices and called party devices). For example, the end-user communication devices may include a wireless device 426 (e.g., a wireless telephone or cellular telephone), a hand-held computing device 451 (e.g., a personal digital assistant (PDA) or a tablet computer), a laptop computer 452, a desktop computer 453, or a VoIP telephone 454, among other alternatives. The IP Access network 428 may receive communications from any device that is connected to an IP network.

The subject line messaging application server 401 includes a processor 402, a memory 404 coupled to the processor 402, subject line messaging application server logic 406, and a call setup interface 412. In a particular embodiment, the subject line messaging application server logic 406 is implemented by software stored within the memory 404. In another embodiment, the subject line messaging application server logic 406 may be implemented by hardware or programmable logic circuitry.

The web server 435 includes a subject line message repository 436, a web portal interface 432, and web server logic 434. In a particular embodiment, the web server logic 434 may be implemented in hardware, software, firmware or any combination thereof.

The device management server 441 includes a caller device interface 440 and device management server logic 442. In a particular embodiment, the device management server logic 442 may be implemented in hardware, software, firmware or any combination thereof.

During operation, a user may communicate with and receive access to the web server 435 via messages utilizing the IP Access Network 428. In a particular embodiment, a message received at the IP Access Network 428 is then communicated to the web server 435. For example, the user may access the web server 435 via the web portal interface 432 to provide a user selected subject line message 430. The user selected subject line message 430 is provided by the user of a caller device to request a particular subject line message to be stored at the caller device for subsequent use during communication. In one embodiment, the user selected subject line message 430 includes a default subject line message selected from a list of default subject line messages displayed via the web portal interface 432. In another embodiment, the user selected subject line message 430 includes a user defined subject line message (e.g., a custom message) supplied by the user via the web portal interface 432. The user selected subject line message 430 is received at the web portal interface 432 and is processed by the web server logic 434. Further, the web portal interface 432 is adapted to receive a user selection of at least one caller device to receive the user selected subject line message 430. For example, the caller device may include the wireless device 426, the hand-held computing device 451, the laptop computer 452, the desktop computer 453, or the VoIP telephone 454, among other alternatives. The web server logic 434 determines a message identifier 418 of the user selected subject line message 430 and determines at least one unique identifier (UID) 438 associated with the at least one caller device selected by the user to receive the user selected subject line message 430. For example, the user may select more than one caller device to receive the user selected subject line message 430, resulting in more than one UID 438 being associated with a particular user selected subject line message 430 and message identifier 418. The web server logic 434 stores the user selected subject line message 430, the message identifier 418, and the at least one UID 438 at the subject line message repository 436.

In a particular embodiment, the subject line message repository 436 is further adapted to store a plurality of default subject line messages. In one embodiment, the default subject line messages include information related to a reason for a telephone call (e.g., health issue, question, weekend plans, advice). Further, the reason for the telephone call may include the nature of the telephone call (e.g., an urgency of the telephone call). Providing the reason for the telephone call via the subject line message may enable called parties to decide whether to answer an incoming telephone call or to reject the incoming telephone call. Caller ID information may not be available at times (e.g., a PBX number), and even if Caller ID information is available it provides no information about the reason for the telephone call or the urgency of the telephone call. The web portal interface 432 is further adapted to display one or more of the plurality of default subject line messages for user selection. Alternatively, the web portal interface 432 may receive a user defined subject line message. For example, the user defined subject line message allows a user to provide a non-generic message not displayed in the list of default subject line messages. Thus, the user of an end-user communication device (e.g., the wireless device 426) may select a default subject line message or may provide a custom subject line message.

In a particular embodiment, the user defined subject line message may be screened to determine whether the message includes allowable subject matter. In one embodiment, the web server logic 434 includes logic to determine whether the user defined subject line message includes allowable subject matter, which may include logic to identify offensive subject matter contained in the user defined subject line message. For example, user defined subject line messages may be screened for allowable subject matter based on parental control settings or other information associated with a particular subscriber account. In this manner, the web server logic 434 may remove or otherwise restrict subject matter deemed offensive to a particular user or owner of a particular end-user communication device. In one embodiment, the web server logic 434 includes logic to store the user defined subject line message when the user defined subject line message includes allowable subject matter. Subject matter that is deemed allowable based on the web server filtering process is stored within the subject line message repository 436. In one embodiment, the web server logic 434 includes logic to reject the user defined subject line message when the user defined subject line message does not include allowable subject matter. Subject matter that is not deemed allowable based on the web server filtering process is rejected and not stored within the subject line message repository 436.

In a particular embodiment, the web portal interface 432 is adapted to allow the user to enable or disable subject line message services. In another particular embodiment, the web portal interface 432 is adapted to receive a user selection of one or more telephone numbers of callers that are authorized to send subject line messages, and the web server logic 434 includes logic to store the one or more authorized telephone numbers at the subject line message repository 436 as a list of enabled telephone numbers. In another particular embodiment, the web portal interface 432 is adapted to receive a user selection of one or more telephone numbers of callers that are not authorized to send subject line messages, and the web server logic 434 includes logic to store the one or more unauthorized telephone numbers at the subject line message repository 436 as a list of disabled telephone numbers. For example, the called party may want only team members or a supervisor to be able to send subject line messages (e.g., a caller white list), while other callers are not allowed to send subject line messages (e.g., a caller black list). Thus, the caller white list may be stored to allow transmission of subject line messages from authorized callers, and the caller black list may also be stored to block transmission of subject line messages from unauthorized callers. In this manner, the receiving party (e.g., the called party) can provide for further security and filters with respect to subject line message communications.

After storage at the subject line message repository 436, information 444 including the user selected subject line message 430, the message identifier 418 and the at least one UID 438 is sent from the subject line message repository 436 to the device management server logic 442 of the device management server 441. The caller device interface 440 of the device management server 441 receives the information 444 from the device management server logic 442 and transmits the information 444 through the IP Access Network 428 for storage at one or more of the end-user communication devices. For example, the one or more end-user communication devices may include the wireless device 426, the hand-held computing device 451, the laptop computer 452, the desktop computer 453, or the VoIP telephone 454, among other alternatives. The information 444 includes a particular UID 438 associated with a particular end-user communication device. As noted above, in the event that the user selects more than one end-user communication device to receive the user selected subject line message 430, each selected end-user communication device receives a different UID 438 (e.g. a first UID associated with wireless device 426, and a second UID associated with VoIP telephone 454).

After receipt of the information 444 from the device management server 441, the end-user communication device (e.g., a caller device such as the wireless device 426) may store the information 444 including the user selected subject line message 430, the message identifier 418, and the UID 438 associated with the particular device in memory. As previously described, the message identifier 418 is used to retrieve the user selected subject line message 430 from the subject line message repository 436. Thus, storing the message identifier 418 at the end-user communication device prevents a user from editing or modifying the user selected subject line message 430 in order to send a subject line message containing offensive subject matter. Further, the UID 438 may be used to ensure that subject line messages are sent from authorized end-user communication devices, as described below.

A caller may select the user selected subject line message 430 at a caller device for transmission to a called party device, allowing the caller to provide information to a called party related to a reason for a telephone call. In one embodiment, the caller selects the user selected subject line message 430 via a keypad, touchscreen, or other input at the caller device.

For example, a caller at the wireless device 426 may want to provide a reason for the telephone call to the called party at the VoIP telephone 454. A call setup signaling message 416 including the message identifier 418 is communicated from the wireless device 426 to the SIP proxy server 414. The message identifier 418 is then communicated via the call setup interface 412 of the subject line messaging application server 401. The subject line messaging application server logic 406 retrieves a subject line message 422 associated with the message identifier 418 from the subject line message repository 436 of the web server 435. The subject line messaging application server logic 406 communicates the subject line message 422 via the call setup interface 412 to the SIP proxy server 414. The call setup signaling message 416 including the subject line message 422 is communicated from the SIP proxy server 414 via the IP Access Network 428 to the called party device (e.g., the VoIP telephone 454). Thus, in a particular embodiment, the message identifier 418 of the call setup signaling message 416 received from the caller device (e.g., the wireless device 426) is translated into the subject line message 422 for delivery via the IP Access Network 428 to the called party device (e.g., the VoIP telephone 454).

The home subscriber server (HSS) 424 is adapted to provide IP based authorization, accounting and authentication (AAA) functions and is adapted to store one or more subscriber profiles, registration data, network policy rules, or any combination thereof. The SIP proxy server 414 also includes logic to retrieve data from the HSS 424. In one embodiment, the SIP proxy server 414 retrieves data from the HSS 424 based on a particular subscriber phone number associated with a particular end-user communication device.

In addition, the SIP proxy server 414 includes IP Multimedia Subsystem (IMS) session call session control functions (S-CSCF). In one embodiment, the SIP proxy server 414 includes originating S-CSCF and terminating S-CSCF. In a particular embodiment, the originating S-CSCF retrieves an originating initial filter criteria (iFC) from the HSS 424, and the terminating S-CSCF retrieves a terminating iFC from the HSS 424. In one embodiment, the originating iFC and the terminating iFC are used by the SIP proxy server 414 to route the telephone call to the subject line messaging application server 401, which manages the subject line message services of caller devices and called party devices.

The subject line messaging application server 401 may be used to prevent subject line messages being sent from a particular caller device. For example, the particular caller device may be associated with a subscriber that has disabled the subject line message service. As a further example, the caller may be delinquent on an account (e.g., the caller has not paid one or more recent bills). In the event that the subscriber associated with the particular caller device (e.g., the caller device 340 of FIG. 3) has disabled the service, a SIP subject header (e.g., the SIP subject header 308 of FIG. 3) including the message identifier (e.g., the message identifier 310 of FIG. 3) is removed from a SIP INVITE message (e.g., the SIP INVITE message 306 of FIG. 3). Otherwise, the subject line message (e.g., the subject line message 334 of FIG. 3) is retrieved from the subject line message repository (e.g., the subject line message repository 316 of FIG. 3) based on the message identifier.

The subject line messaging application server 401 may also be used to prevent subject line messages being sent to a particular called party device. For example, the particular called party device may be associated with a subscriber that has disabled the subject line message service. As a further example, the called party may be delinquent on an account (e.g., the called party has not paid one or more recent bills). In the event that the subscriber associated with the particular called party device (e.g., the called party device 342 of FIG. 3) has disabled the service, a modified SIP subject header (e.g., the modified SIP subject header 332 of FIG. 3) including the subject line message (e.g., the subject line message 334 of FIG. 3) is removed from the SIP INVITE message (e.g., the SIP INVITE message 306 of FIG. 3). As a further example, the subscriber associated with a particular called party device may have created a white list or a black list. If a particular caller device (e.g., the caller device 340 of FIG. 3) is included in the white list, the modified SIP subject header including the subject line message is transmitted to the particular called party device. If the particular caller device is included in the black list, the modified SIP subject header including the subject line message is removed from the SIP INVITE message. In one embodiment, the SIP proxy server 414 retrieves information related to the white list and the black list from the HSS 424 based on the UID of the particular caller device.

Figure 5:
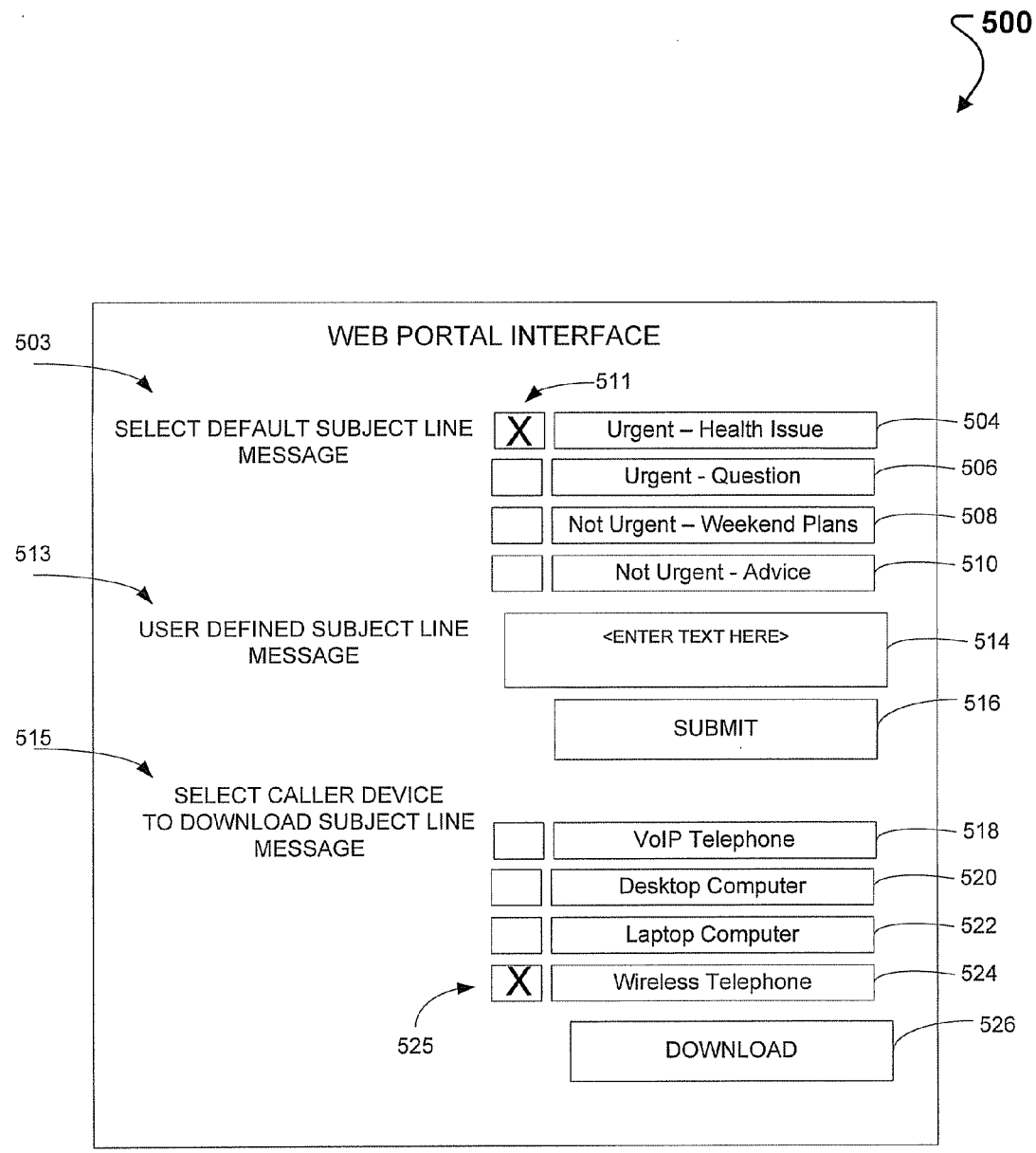
FIG. 5 is an illustration of a first particular embodiment of a web portal interface.

Referring to FIG. 5, a first particular embodiment of a web portal interface is illustrated, at 500. In a particular embodiment, the web portal interface 432 as shown in FIG. 4 may be implemented as the web portal interface 500 as shown in FIG. 5. Referring to FIG. 5, in a particular embodiment, the web portal interface 500 includes an area 503 for a user to select a default subject line message from a list of predetermined subject line messages. For example, a default subject line message may include the text "Urgent—Health Issue" 504, "Urgent—Question" 506, "Not Urgent—Weekend Plans" 508, "Not Urgent—Advice" 510, among other alternatives. A user may select one or more of the default subject line messages using a checkbox 511 or other selection means. In the embodiment shown in FIG. 5, the web portal interface 500 includes an area 513 for the user to enter a user defined subject line message. For example, the user may enter user defined subject line message text into a text box 514. Upon entering the user defined subject line message text at the text box 514, the user may click a submit button 516 to submit the user defined subject line message. In one embodiment, after clicking the submit button 516 to submit the user defined subject line message, the system determines whether the user defined subject line message includes allowable subject matter. In the embodiment shown in FIG. 5, the web portal interface 500 includes an area 515 for the user to select one or more caller devices to receive one or more subject line messages. For example, the one or more caller devices may include the VoIP telephone 518, the desktop computer 520, the laptop computer 522, or the wireless telephone 524, among other alternatives. The user may request that the one or more user selected subject line messages be transmitted to the selected caller devices by clicking a download button 526. For example, the one or more subject line messages may be transmitted to the one or more caller devices via the caller device interface 440 of the device management server 411, as shown in FIG. 4.

Figure 6:
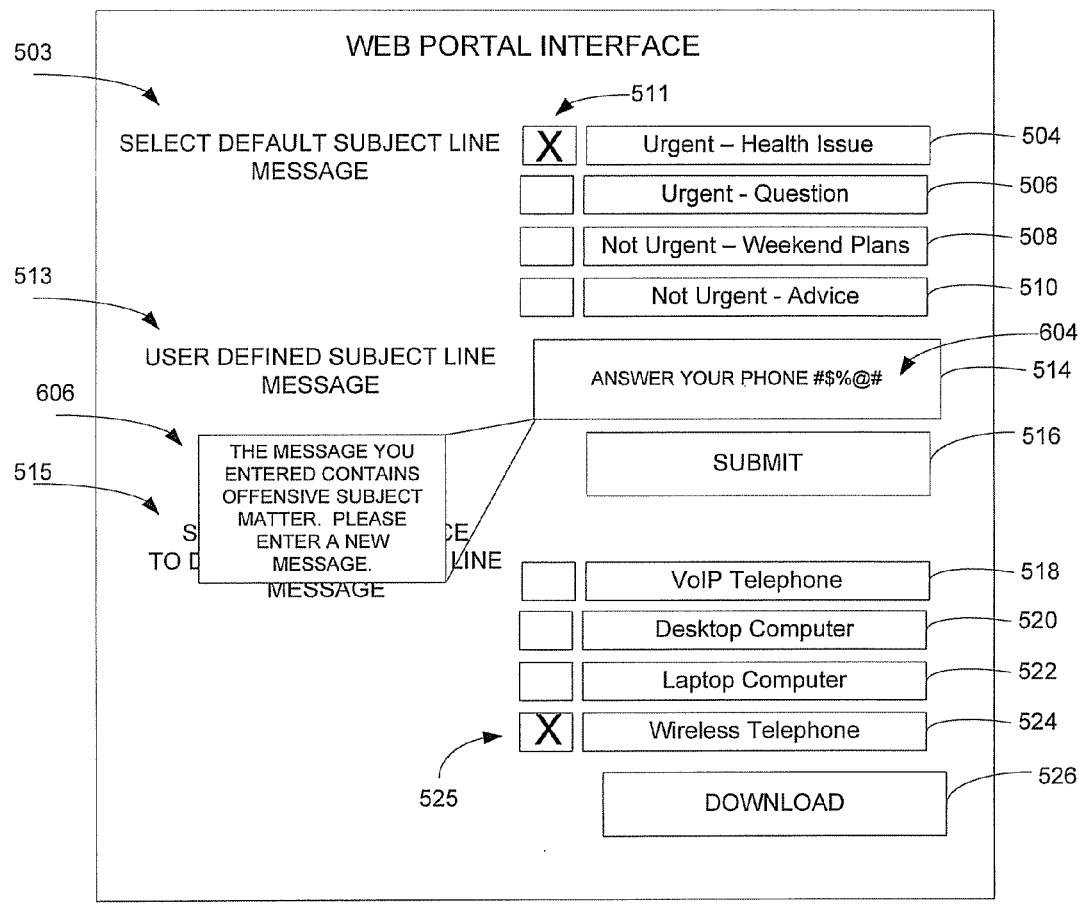
FIG. 6 is an illustration of a second particular embodiment of a web portal interface.

Referring to FIG. 6, a second particular embodiment of a web portal interface is illustrated, at 600. When a user enters a user defined subject line message 604 at the text box 514, the system determines whether the user defined subject line message 604 contains allowable subject matter. For example, in the particular embodiment shown in FIG. 6, the user defined subject line message 604 includes the message "ANSWER YOUR PHONE #$%@#." Because the user defined subject line message 604 contains offensive subject matter, a message 606 may be displayed. For example, the message 606 may include the message, "The Message You Entered Contains Offensive Subject Matter. Please Enter a New Message". A user may then enter a new user defined subject line message 604 at the text box 514. In the event that the user defined subject line message 604 includes allowable subject matter, the user defined subject line message 604 is stored at a subject line message repository, such as the subject line message repository 436 of FIG. 4. Thus, the system includes a filtering process that automatically filters user defined subject line messages for suspicious or abusive language. In one embodiment, suspicious or abusive language may be flagged for administrator review or approval.

Figure 7:
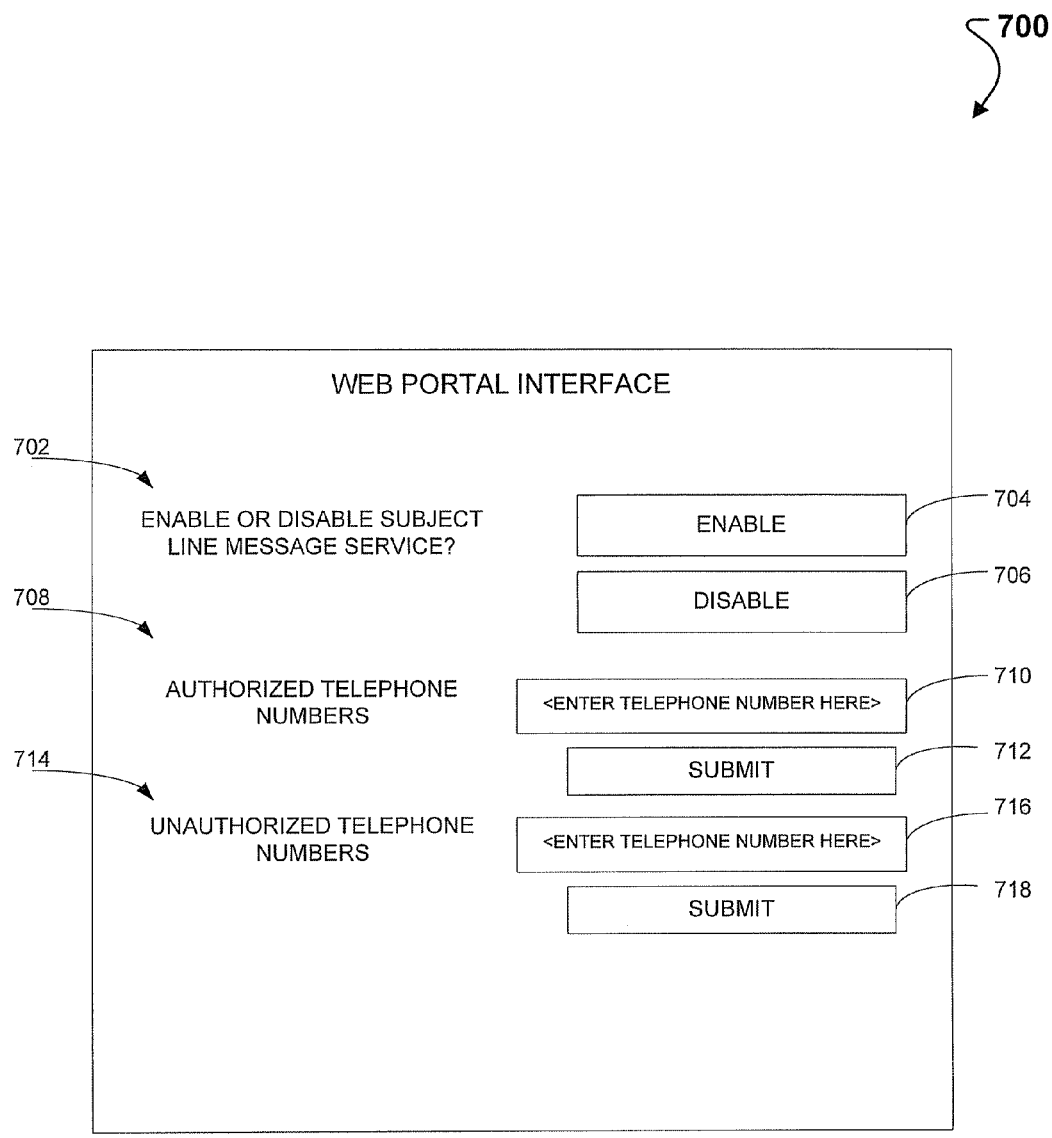
FIG. 7 is an illustration of a third particular embodiment of a web portal interface.

Referring to FIG. 7, a third particular embodiment of a web portal interface is illustrated, at 700. The web portal interface 700 includes an area 702 to enable or disable a subject line message service. For example, a user may click an enable button 704 to enable the subject line message service. Alternatively, the user may click a disable button 706 to disable the subject line message service.

In one embodiment, the web portal interface 700 includes an area 708 to receive a user selection of one or more telephone numbers from which subject line messages may be received. For example, the user may enter one or more authorized telephone numbers into a text box 710. Upon entering the one or more authorized telephone numbers at the text box 710, the user may click a submit button 712 to submit the authorized telephone numbers. In one embodiment, the one or more authorized telephone numbers are stored as a list of enabled telephone numbers at a subject line message repository, such as the subject line message repository 436 of FIG. 4.

In another embodiment, the web portal interface 700 includes an area 714 to receive a user selection of one or more telephone numbers from which subject line messages may not be received. For example, the user may enter one or more unauthorized telephone numbers into a text box 716. Upon entering the one or more unauthorized telephone numbers at the text box 716, the user may click a submit button 718 to submit the unauthorized telephone numbers. In one embodiment, the one or more unauthorized telephone numbers are stored as a list of disabled telephone numbers at the subject line message repository, such as the subject line message repository 436 of FIG. 4.

Figure 8:
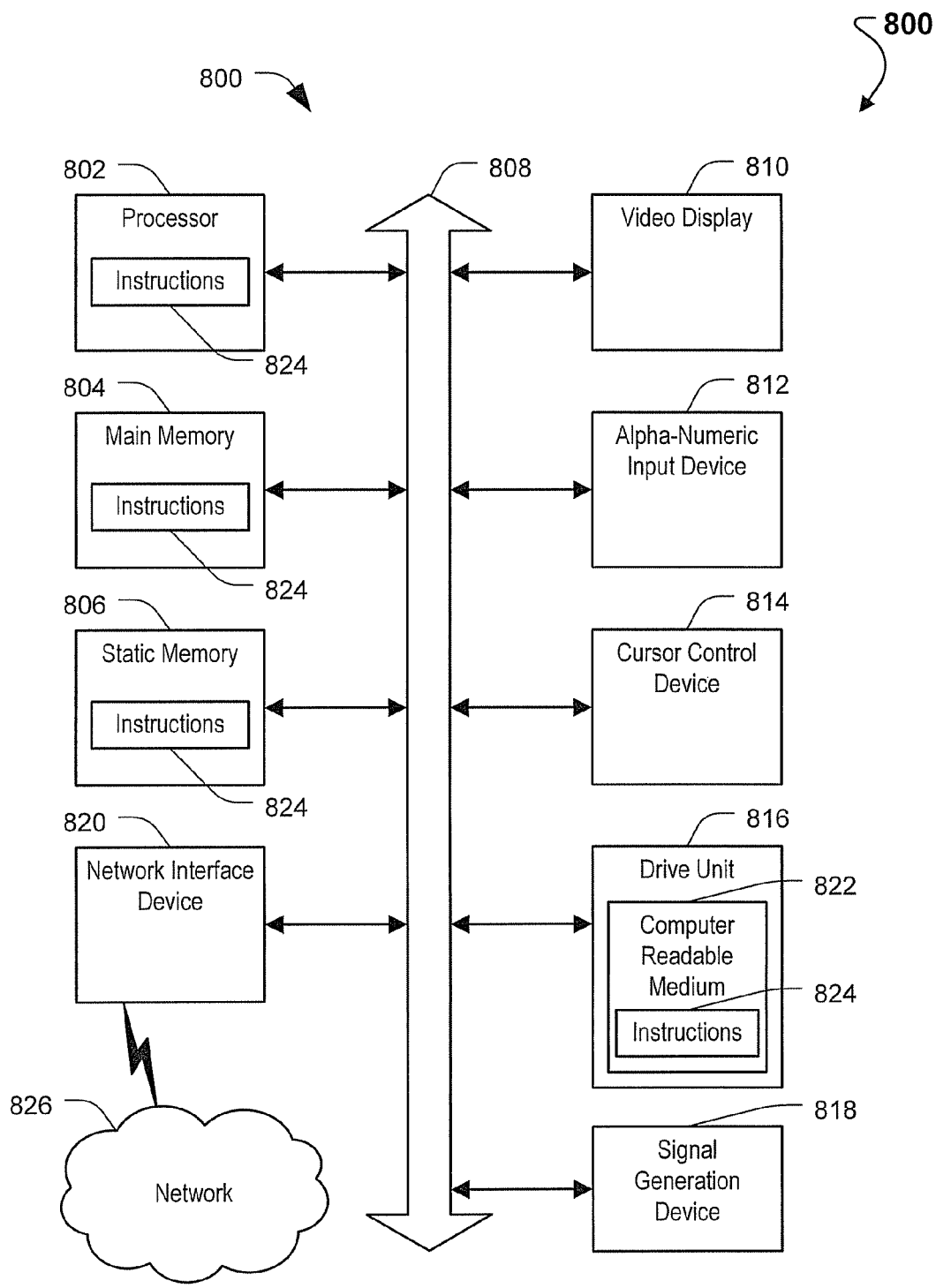
FIG. 8 is an illustration of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the general computer system 800 may include or be included within any one or more of the end-user communication devices (e.g. caller devices and called party devices), servers, repositories, and network equipment illustrated in FIG. 3 and FIG. 4.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a non-transitory computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

A next generation network (NGN) that includes 3GPP IMS standards has been illustrated. The NGN system uses a SIP Protocol for call setup signaling. The NGN architecture separates network accesses, such as control and application services to allow rapid deployment of new application services and features. The NGN network is capable of providing a large variety of real time multimedia communication services consistently over various network access interfaces. Accordingly, the disclosed system provides a framework that enable callers to send subject line messages along with call setup signaling messages to inform the called party about the nature of the call before the call is answered. The disclosed framework enhances user end-point device capabilities for sending and receiving and displaying by introducing a new application server to store messages and also to insert the subject line messages in the call offered to the called party device. The disclosed system and method is based on SIP standards to provide inter-operability in a particular embodiment. The subject line message service provides an enhanced service provider web portal to allow users to create and store messages to be sent at call setup time. The system also allows a user to enable or disable the service by callers and called parties and enables filtering of subject line messages for allowable subject matter. The system further includes a scan process that automatically filters newly created messages for suspicious or abusive language and flags such language for administrator review and approval. In addition, the system includes a method to propagate approved messages including subject line information to a variety of different customer premises equipment (CPE) devices owned by the message creator. In addition, the system and method allows a user to set-up an authorize a list of people that can send and receive the subject line messages as defined.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving a call setup signaling message associated with a caller device at a subject line messaging application server from a terminating internet protocol multimedia subsystem session call session control functions server configured to transmit the call setup signaling message to a called party device, wherein the call setup signaling message includes a session initiation protocol INVITE message, wherein the session initiation protocol INVITE message includes a session initiation protocol subject header, and wherein the session initiation protocol subject header includes a message identifier that corresponds to a pre-defined subject line message selected by a caller from a list of pre-defined subject line messages shown to the caller via an interface;

determining, by the subject line messaging application server, if a session initiation protocol subject header should be removed based on a called party device information;

modifying the call setup signaling message to produce a modified call setup signaling message by:

removing, via the subject line messaging application server, the session initiation protocol subject header when a removal determination indicates removal of the session initiation protocol subject header based on the called party device; and replacing the message identifier of the call setup signaling message with the pre-defined subject line message corresponding to the message identifier when the removal determination indicates that the session initiation protocol subject header should remain; and sending the modified call setup signaling message to the terminating internet protocol multimedia subsystem session call session control functions server.

2. The method of claim 1, wherein the pre-defined subject line message includes information provided by the caller to the called party device related to a reason for a telephone call.

3. The method of claim 1, wherein the modified call setup signaling message is received by the called party device via an interne protocol access network.

4. The method of claim 1, wherein the terminating internet protocol multimedia subsystem session call session control functions server transmits the modified call setup signaling message to the called party device.

5. The method of claim 1, wherein a determination that the caller device is authorized to send the pre-defined subject line message is made prior to the subject line messaging application server receiving the call setup signaling message from the terminating internet protocol multimedia subsystem session call session control functions server.

6. The method of claim 5, wherein the caller device is authorized to send the pre-defined subject line message when the caller device is associated with a party included in a list of subscribers to a subject line messaging service.

7. The method of claim 5, wherein the caller device is authorized to send the pre-defined subject line message when a telephone number of the caller device is included in a list of authorized caller telephone numbers.

8. The method of claim 5, wherein the caller device lacks authorization to send the pre-defined subject line message when payment to an account associated with the caller device is delinquent.

9. The method of claim 1, wherein the session initiation protocol subject header is removed when the removal determination indicates at least one of:

the called party device is not enabled to receive subject line messages; and the called party device is not authorized to receive subject line messages from the caller device.

10. The method of claim 1, wherein the pre-defined subject line message is retrieved from the pre-defined subject line messages.

11. A communication system, comprising:
a processor;
a memory coupled to the processor;
a call setup interface adapted to receive a call setup signaling message from a caller device via a terminating server of a communication system, wherein the call setup signaling message includes a session initiation protocol INVITE message, wherein the session initiation protocol INVITE message includes a session initiation protocol subject header, and wherein the session initiation protocol subject header includes a message identifier that corresponds to a pre-defined subject line message selected by a caller from a list of pre-defined subject line messages shown to the caller via a web portal interface;

logic to determine if a session initiation protocol subject header should be removed based on a called party device information;

logic to modify the call setup signaling message to produce a modified call setup signaling message, wherein the logic to modify the call setup signaling message removes the session initiation protocol subject header when a removal determination indicates removal of the session initiation protocol subject header based on a called party device, and wherein the logic to modify the call setup signaling message replaces the message identifier of the call setup signaling message with the pre-defined subject line message corresponding to the message identifier when the removal determination indicates that the session initiation protocol subject header should remain; and logic to send the modified call setup signaling message to the terminating server via the call setup interface.

12. The system of claim 11, further comprising:
a subject line message repository adapted to store the pre-defined subject line messages and corresponding message identifiers.

13. The system of claim 12, further comprising:
the web portal interface, the web portal interface adapted to:
receive selection of the pre-defined subject line message; and
receive a selection of at least one caller device to receive the pre-defined subject line message;
logic to determine the message identifier of the pre-defined subject line message; and
logic to determine at least one unique identifier associated with the at least one caller device.

14. The system of claim 13, further comprising logic to store the at least one unique identifier associated with the at least one caller device at the subject line message repository.

15. The system of claim 13, wherein the web portal interface is further adapted to receive a user defined subject line message.

16. The system of claim 15, further comprising logic to determine whether the user defined subject line message includes allowable subject matter.

17. The system of claim 16, wherein the logic to determine whether the user defined subject line message includes allowable subject matter includes logic to identify offensive subject matter.

18. The system of claim 16, further comprising:
logic to store the user defined subject line message at the subject line message repository when the user defined subject line message includes allowable subject matter; and
logic to reject the user defined subject line message when the user defined subject line message does not include allowable subject matter.

19. The system of claim 13, wherein the web portal interface is further adapted to receive a user selection of one or more telephone numbers from which subject line messages may be received, and further comprising logic to store the one or more telephone numbers at the subject line message repository as a list of enabled telephone numbers.

20. The system of claim 13, wherein the web portal interface is further adapted to receive a user selection of one or more telephone numbers from which subject line messages may not be received, and further comprising logic to store the one or more telephone numbers at the subject line message repository as a list of disabled telephone numbers.

21. The system of claim 13, further comprising:
   a caller device interface; and
   logic to transmit the pre-defined subject line message, the message identifier of the pre-defined subject line message, and the unique identifier of the at least one caller device to the at least one caller device via the caller interface.

22. The system of claim 21, wherein the at least one caller device includes at least one of a voice over internet protocol telephone, a desktop computer, a laptop computer, and a wireless telephone.

23. The system of claim 21, further comprising:
   a home subscriber server adapted to provide internet protocol based authorization, accounting and authentication functions and adapted to store one or more of subscriber profiles, registration data, and network policy rules; and
   an originating server of the communication system, comprising logic to retrieve data from the home subscriber server based on the at least one unique identifier associated with the at least one caller device.

24. A non-transitory computer-readable storage medium comprising operational instructions that, when executed by a processor, cause the processor to:

receive a call setup signaling message associated with a caller device via a terminating server of a communication system, wherein the call setup signaling message includes a session initiation protocol INVITE message, wherein the session initiation protocol INVITE message includes a session initiation protocol subject header, and wherein the session initiation protocol subject header includes a message identifier that corresponds to a pre-defined subject line message selected by a caller from a list of pre-defined subject line messages shown to the caller via an interface;

determine if a session initiation protocol subject header should be removed based on a called party device information;

modify the call setup signaling message to produce a modified call setup signaling message, wherein the call setup signaling message is modified by removal of the session initiation protocol subject header when a removal determination indicates removal of the session initiation protocol subject header based on a called party device, and wherein the call setup signaling message is modified by replacement of select the message identifier of the call setup signaling message with the pre-defined subject line message corresponding to the message identifier when the removal determination indicates that the session initiation protocol subject header should remain; and send transmit the modified call setup signaling message to the terminating server, wherein the terminating server transmits the call setup signaling message to a called party device.

* * * * *

UNITED STATES PATENT AND TRADEMARK OFFICE
CERTIFICATE OF CORRECTION

PATENT NO.        : 8,332,481 B2
APPLICATION NO.   : 12/262286
DATED             : December 11, 2012
INVENTOR(S)       : Niral Sheth et al.

It is certified that error appears in the above-identified patent and that said Letters Patent is hereby corrected as shown below:

In the Claims:

Column 15, Claim 3, Line 30, "interne protocol access network." should read --internet protocol access network.--.

Column 18, Claim 24, Line 22, "replacement of select the message identifier of the call" should read --replacement of the message identifier of the call--.

Column 18, Claim 24, Line 28, "send transmit the modified call setup signaling message to" should read --send the modified call setup signaling message to--.

Signed and Sealed this
Twentieth Day of August, 2013

Teresa Stanek Rea
*Acting Director of the United States Patent and Trademark Office*